United States Patent [19]

Jabbari et al.

[11] Patent Number: 5,267,376
[45] Date of Patent: Dec. 7, 1993

[54] APPARATUS FOR ATTACHING A PRINTED CIRCUIT CABLE MOUNT

[75] Inventors: Iraj Jabbari, Santa Clara County; Michael J. Darling, Santa Cruz County; Brian L. Phillips, San Jose, all of Calif.

[73] Assignee: Seagate Technology, Inc., Scotts Valley, Calif.

[21] Appl. No.: 611,992

[22] Filed: Nov. 9, 1990

[51] Int. Cl.[5] ............................................. A44B 21/00
[52] U.S. Cl. .................................................... 24/457
[58] Field of Search .................... 24/457, 458, 459; 248/231.6, 231.8, 316.6, 316.7; 439/162–165

[56] References Cited

U.S. PATENT DOCUMENTS

| | | | |
|---|---|---|---|
| 2,222,449 | 11/1940 | Tinnerman | 24/458 X |
| 2,685,330 | 8/1954 | Handren, Jr. et al. | 24/458 X |
| 2,746,112 | 5/1956 | Simon | 24/457 X |
| 4,933,785 | 6/1990 | Morehouse et al. | 360/137 X |

FOREIGN PATENT DOCUMENTS 2436273  4/1980  France .................................. 24/458

Primary Examiner—James R. Brittain
Attorney, Agent, or Firm—Flehr, Hohbach, Test, Albritton & Herbert

[57] ABSTRACT

Apparatus of the disclosure for securing a printed circuit cable to the actuator arm in a disc drive described. The apparatus is designed to effectuate bias minimization and bias consistency during repeated operation of the disc head assembly. Additionally, the printed circuit cable is attached without using adhesive.

4 Claims, 2 Drawing Sheets

APPARATUS FOR ATTACHING A PRINTED CIRCUIT CABLE MOUNT

The present invention relates generally to disc drive systems and particularly to apparatus for attaching a printed circuit cable to the read/write head actuator arm assembly whereby a minimum amount of bias due to the cable is applied to the arm and the residual bias is consistent during repeated actuator arm rotation.

BACKGROUND INVENTION

The present invention provides an improvement to the read/write head actuator assembly in small disc drive systems. The preferred embodiment is designed to connect a printed circuit cable (PCC) to the actuator arm such that the bias due to the cable upon the arm is minimized and the residual bias is consistent during repeated arm rotation. Consistency in the bias is required so that the actuator control motor may provide the proper force to overcome the bias and position the actuator arm relative to the disc in a repeatable fashion.

In a disc drive, the read/write heads are attached to an actuator arm. A voice coil magnetic motor provides the force to move the arm about a pivot and position the heads over a desired portion of the disc. This arrangement is known as a head disc assembly.

The information supplied to the heads (write) or supplied by the heads (read) is normally carried by small wires from the heads to a point near the actuator arm pivot. A flexible printed circuit cable (PCC) is secured to the arm and the small signal carrying wires are soldered to the PCC. Additionally, the PCC carries signals to activate the moving coil motor and effectuate actuator arm rotation. In many disc drives, the PCC carries the read head signals from the moving arm to a fixed circuit board having a preamplifier to amplify the signals before sending them to a signal processing circuit elsewhere in the disc drive.

In many previous disc drive designs, the flexible PCC was bent to form an arc between the circuit board and the arm. The end attached to the arm is usually secured via an adhesive. The use of adhesive within the disc housing is usually to be avoided, except in arrangements where no other choice is apparent, because adhesives may outgas and produce particles which will contaminate the discs and or the heads. Additionally, the use of adhesives in manufacturing makes repeatable assembly very difficult. Adhesives are used in this situation to avoid adding mass to the actuator arm. Disc drive designers have deemed a small amount of adhesive as necessary at the expense of outgassing problems and manufacturing repeatability.

Another area of concern is the arc in the PCC applying a force upon the arm and pivoting the arm to an arbitrary position. This force is called bias. The bias must be overcome by the actuator motor to reposition the arm. Thus, a large bias requires a powerful motor to overcome the bias.

In small disc drives, it is desired to design the actuator motor as small as possible. This requires using low mass parts, reducing bearing friction, and minimizing the bias. In addition to minimizing the bias, the bias must be consistent during repeated operation of the actuator arm. A consistent bias means the actuator motor can be designed and operated to overcome a specific, known bias over the full operating range of the actuator arm.

Past attempts at minimizing the bias have resulted in complex cabling strategies. One such connection disclosed in U.S. Pat. No. 4,933,785 maintains two opposing bend radii in the PCC to obtain counteracting bias forces resulting in bias minimization. A simplified cabling assembly is desired to reduce production costs.

An objective of the current invention is to provide an attachment apparatus which maintains a small bias that is consistent during repeated arm rotations. In particular, the apparatus maintains a specific bend radius in the PCC to effectuate the bias consistency, but uses a simple arrangement.

Another object of the present invention is to provide a PCC attachment means which does not use adhesive. In particular the invention secures the PCC using a bracket, clip, and screw arrangement.

SUMMARY OF THE INVENTION

In summary, the present invention is apparatus for securing a printed circuit cable to the actuator arm in a disc drive. The apparatus is designed to effectuate bias minimization and bias consistency. Additionally, the cable is secured without using adhesive.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
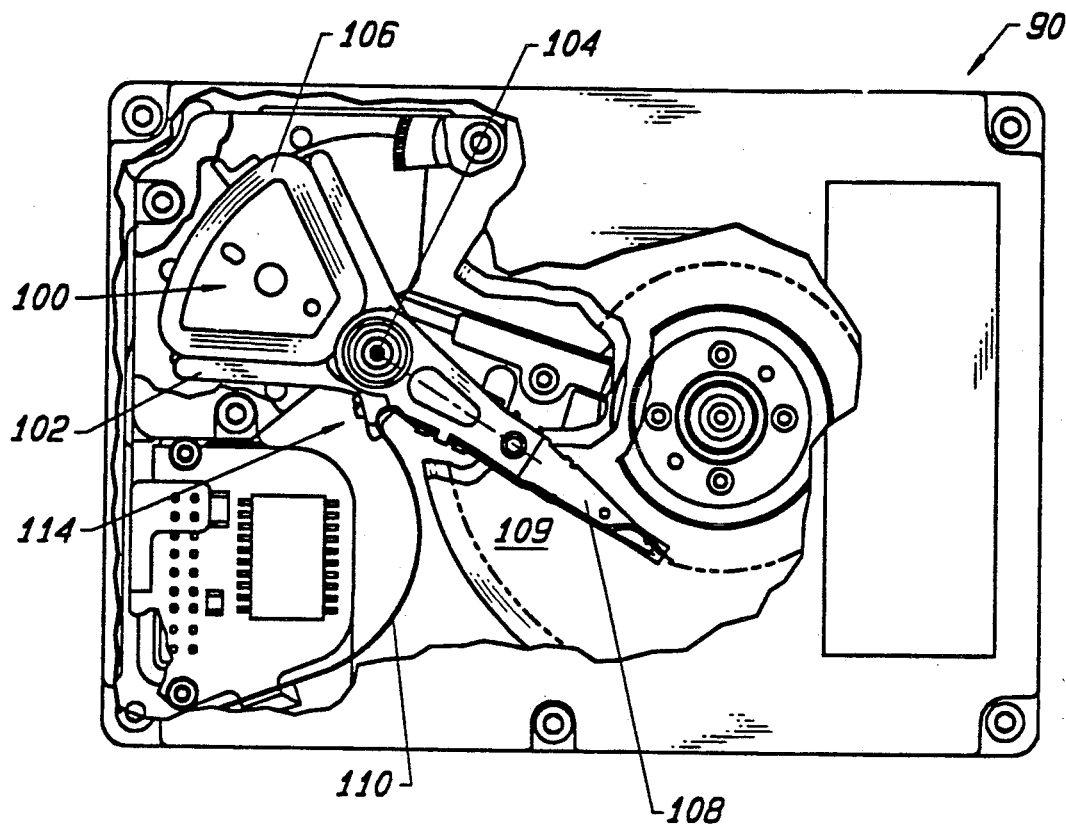
FIG. 1 is a cut-away view of a disc drive incorporating the preferred embodiment of the invention.

Referring to FIG. 1, there is shown an cut-away view of an entire disc drive assembly 90 incorporating the preferred embodiment. The actuator arm assembly 100 includes a substantially triangular shaped actuator arm 102 having a pivot point 104 around which the arm 102 rotates. A motor assembly 106 is attached to one end of arm 102 to provide the force required to pivot the arm 102. Located at the other end of arm 102 is a read/write head assembly 108. In combination, the motor assembly 106 provides the force to rotate arm 102 about pivot 104 to position the read/write head assembly 108 adjacent to a specified position on a disc 109.

Figure 2A:
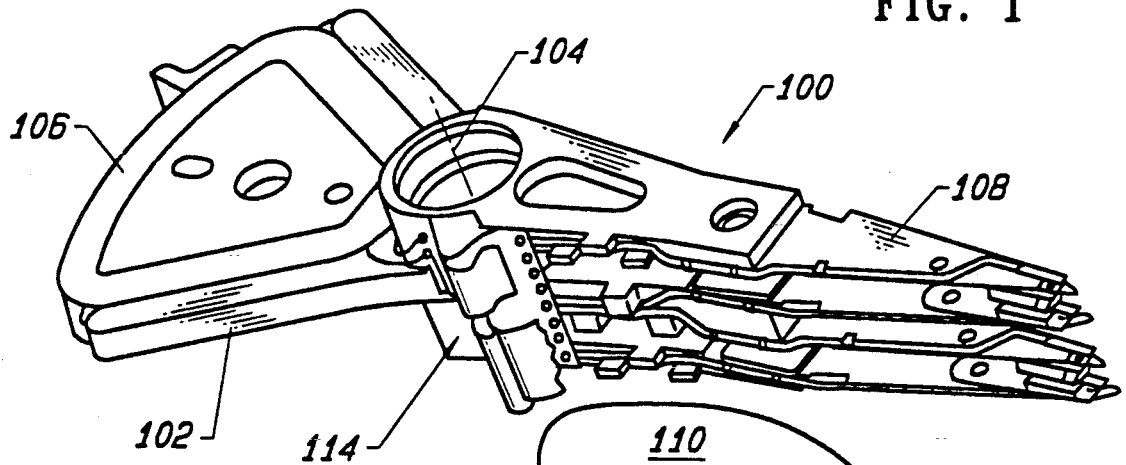
FIG. 2A is an isometric view of an actuator arm in a disk drive incorporating the preferred embodiment of the invention.
Figure 2B:
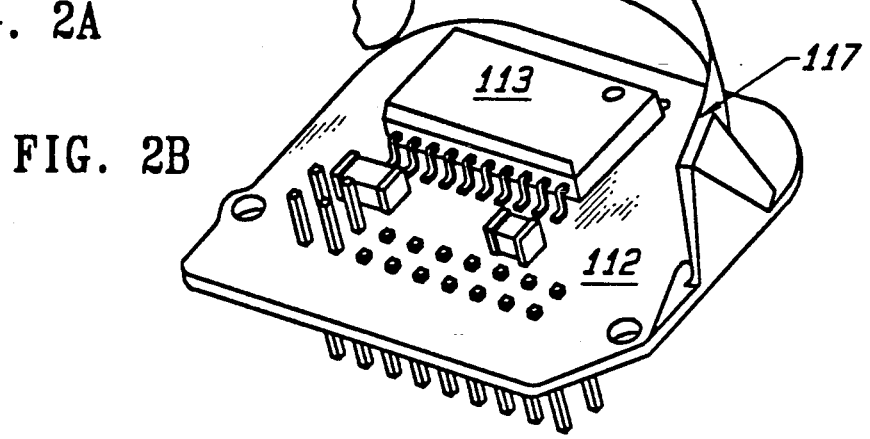
FIG. 2B is an isometric view of a printed circuit cable and printed circuit card in a disc drive incorporating the preferred embodiment of the invention.

The information to and from the read/write heads 108 and the signals to effectuate movement of the motor assembly 106 is supplied to the moving portion of the arm assembly 100 via a printed circuit cable (PCC) 110. A fixed printed circuit card 112 supplies the signals for motor control and the write heads to the PCC. Additionally, a preamplifier integrated circuit 113 is on card 112 to amplify the read signals from the heads 108. FIG. 2A is an isometric view of, the actuator arm assembly 100 in combination with PCC 110 and printed circuit card 112 illustrated in FIG. 2B.

It is important that PCC 110 is secured at each end to provide a stable connection at both the actuator arm at 114 and the printed circuit card at 117. The preferred embodiment of the current invention focuses upon the necessity for a secure attachment to the actuator arm 102 at 114.

Figure 3:
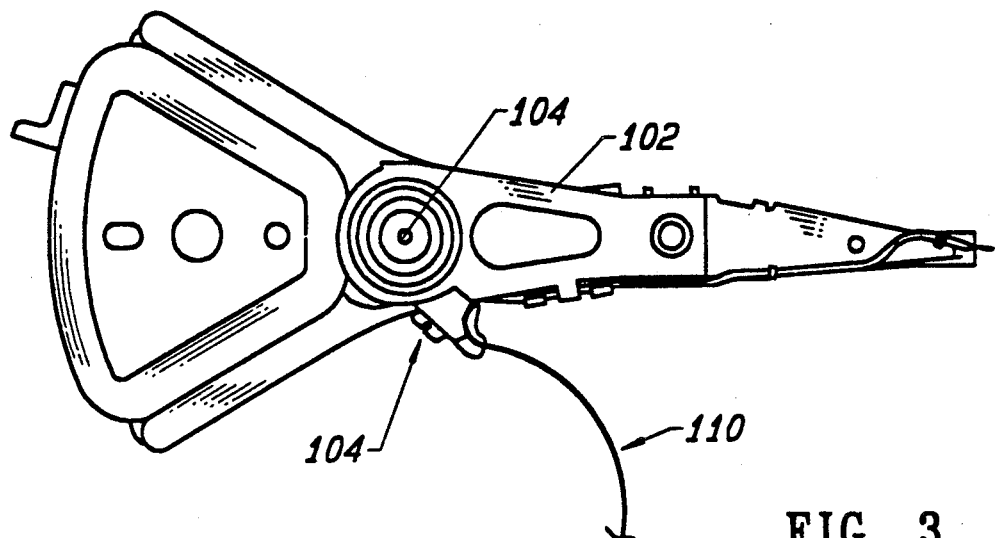
FIG. 3 is a planar view of the actuator arm in FIG. 2.

In achieving minimum bias upon actuator arm 102, PCC 110 is secured near pivot 104. Additionally, the inventive cable securing apparatus 114 forces the flexible PCC at its exit 111 into an arc toward the printed circuit card 112, and at its entry 113, after a short loop has been formed in the cable, on a path parallel to the side of the actuator arm. This arrangement is clearly depicted in FIG. 3.

Figure 4:
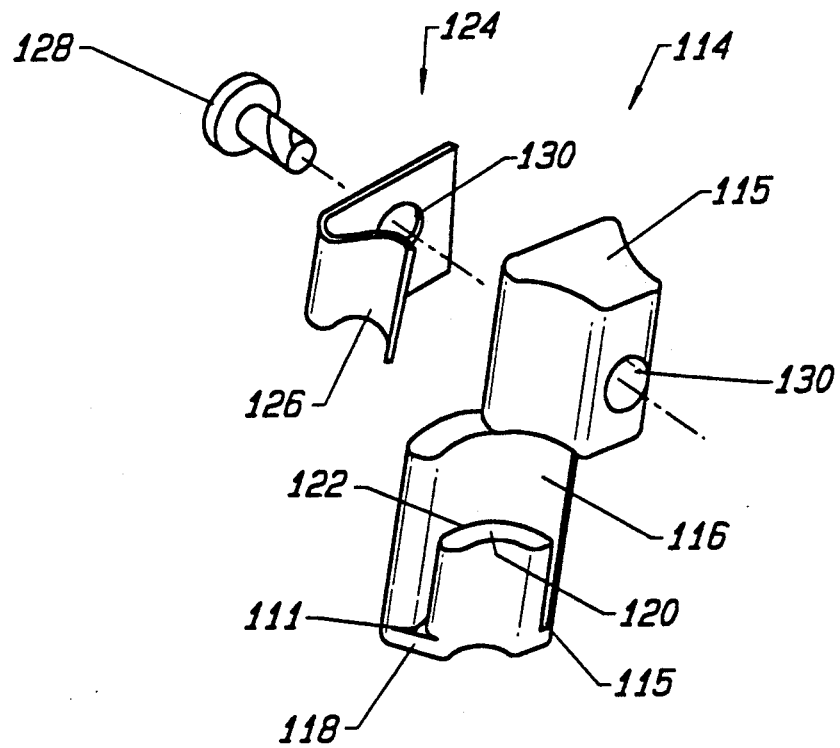
FIG. 4 is an exploded perspective view of a preferred embodiment of the invention.

In FIG. 4 there is shown an exploded perspective view of the preferred embodiment of the invention. The cable securing apparatus includes a bracket 115 having a concave surface 116 along its longitudinal axis. At one end of the bracket is a flange 118 extending essentially perpendicular from the concave surface 116. Attached to flange 118 and extending parallel to concave surface 116 is a cable holder 120. Cable holder 120 has a convex surface 122 which in combination with concave surface 116 of bracket 114 and flange 118 forms a slot for holding a PCC. The opposing concave and convex surfaces 116 and 122 ensure that the PCC is curved properly to minimize the torque applied to the arm and launched in an arc away from the arm toward the printed circuit card.

To maintain the PCC's conformity to the concave surface of the bracket, a clip 124 is provided. The clip has a convex portion 126 matching the concave surface 116 of bracket 115. When clip 124 is attached to bracket 115 by a securing means, the convex surface 116 presses the PCC against concave surface 122 and conforms the PCC 110 to the concave surface. This arrangement maintains the radius of the PCC bend at the attachment point, and thus, the launching position of the PCC into the arc is stable. This stability results in a very consistent bias during repeated rotations of the actuator arm.

The securing means for attaching clip 124 and bracket 115 to actuator arm 102 is provided by a screw 128 and threaded bore (not shown) arrangement as depicted in FIG. 4. A bore 130 is drilled in bracket 115 and clip 124. The screw 128 passes through clip 124 and bracket 115 via bore 130 into a threaded bore in the arm (not shown). The short loop formed on the cable biases the cable end against the side of the actuator arm. With this arrangement the PCC is securely fastened to the arm without the use of contaminatory epoxies or other adhesives. Additionally, the screw 128 provides a point for grounding the PCC ground leads to the metallic arm.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Apparatus for attaching a printed circuit cable to an actuator arm in a disc drive comprising:
   a bracket having a concave surface along a longitudinal axis extending from a first end to a second end;
   said bracket includes a flange extending from said first end and a cable holder extending part way along said bracket from said flange and oriented parallel to said concave surface of said bracket and having a convex surface facing said concave surface of said bracket;
   said convex surface in combination with said concave surface and said flange defining a slot through which said printed circuit cable is disposed;
   a clip attached to said bracket and formed to maintain conformal contact between said printed circuit cable and said concave surface of said bracket; and
   attachment means for attaching said bracket to said actuator arm.

2. The apparatus of claim 1 wherein said attachment means comprises a bore through said bracket, a threaded bore in said actuator arm located at the desired point of attachment, and a screw whereby said screw extends through said bore in said bracket into said threaded bore.

3. The apparatus of claim 1 wherein said concave and said convex surfaces have essentially the same curvature.

4. The apparatus of claim 1 wherein said slot has a width of 0.008 inches.

* * * * *